United States Patent
Bin et al.

(10) Patent No.: US 11,720,204 B2
(45) Date of Patent: Aug. 8, 2023

(54) TIMING CONTROLLER AND METHOD OF DRIVING THE SAME

(71) Applicant: LX SEMICON CO., LTD., Daejeon (KR)

(72) Inventors: Young Hoon Bin, Daejeon (KR); Jae Woo Jeon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/453,022

(22) Filed: Nov. 1, 2021

(65) Prior Publication Data

US 2022/0155935 A1  May 19, 2022

(51) Int. Cl.
*G06F 3/041* (2006.01)
*G09G 5/12* (2006.01)
*G09G 5/18* (2006.01)

(52) U.S. Cl.
CPC ........ *G06F 3/04166* (2019.05); *G06F 3/0412* (2013.01); *G09G 5/12* (2013.01); *G09G 5/18* (2013.01)

(58) Field of Classification Search
CPC ..... G06F 3/04166; G06F 3/0412; G09G 5/12; G09G 5/18
See application file for complete search history.

(56) References Cited

U.S. PATENT DOCUMENTS

| | | | |
|---|---|---|---|
| 2011/0242066 A1* | 10/2011 | Jeon | G09G 3/20 345/204 |
| 2013/0002954 A1* | 1/2013 | Shin | H03L 7/16 348/E5.011 |
| 2013/0241859 A1* | 9/2013 | Saitoh | G06F 3/041 345/212 |
| 2015/0346887 A1* | 12/2015 | Cho | G06F 3/04166 345/174 |
| 2017/0153736 A1* | 6/2017 | Kim | G06F 3/04166 |
| 2020/0097112 A1* | 3/2020 | Seo | G06F 3/044 |
| 2022/0011895 A1* | 1/2022 | Park | G06F 1/3265 |

FOREIGN PATENT DOCUMENTS

| | | |
|---|---|---|
| KR | 10-1615813 B1 | 5/2016 |
| KR | 10-2019-0045481 A | 5/2019 |
| KR | 10-2054669 B1 | 1/2020 |

* cited by examiner

*Primary Examiner* — Hong Zhou
(74) *Attorney, Agent, or Firm* — Hyunho Park

(57) ABSTRACT

A timing controller according to one aspect of the present disclosure that is capable of operating in a low-power mode for a touch sensor driving period includes a receiver which receives a timing synchronization signal and video image data from an external source, a data processor which generates a gate control signal and a data control signal on the basis of the timing synchronization signal and arranges the video image data as pixel data for a display panel, and a transmitter which operates in a normal mode to output the pixel data, the gate control signal, and the data control signal for a display driving period and operates in a low-power mode for at least some time of a touch sensor driving period.

16 Claims, 8 Drawing Sheets

TIMING CONTROLLER AND METHOD OF DRIVING THE SAME

CROSS-REFERENCE TO RELATED APPLICATIONS

This application claims the benefit of the Korean Patent Application No. 10-2020-0151728 filed on Nov. 13, 2020, which is hereby incorporated by reference as if fully set forth herein.

FIELD

The present disclosure relates to a timing controller and a method of driving the same and, more specifically, to a timing controller, which reduces power consumption, and a method of driving the same.

BACKGROUND

With the advancement of the information age, the demand for a display device for displaying an image has increased with various forms. Therefore, various types of display devices such as a non-self-light emitting display device including a liquid crystal display (LCD) device and a plasma display panel (PDP) device and an electroluminescence display device including an organic light emitting display (OLED) device and a quantum dot light emitting display (QLED) device have been recently used.

Figure 1A:
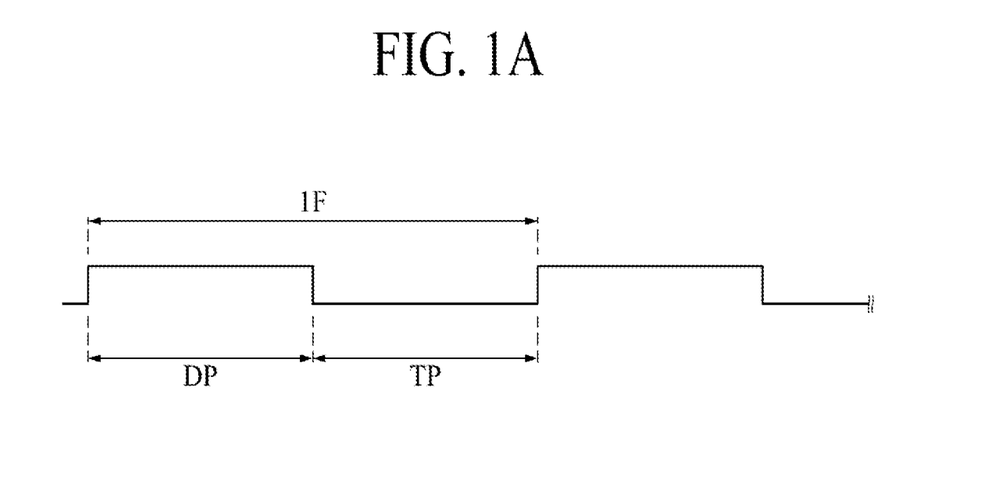
FIG. 1A and FIG. 1B are a diagram illustrating a display driving period and a touch sensor driving period in one frame during time division driving of a general touch display device.
Figure 1B:
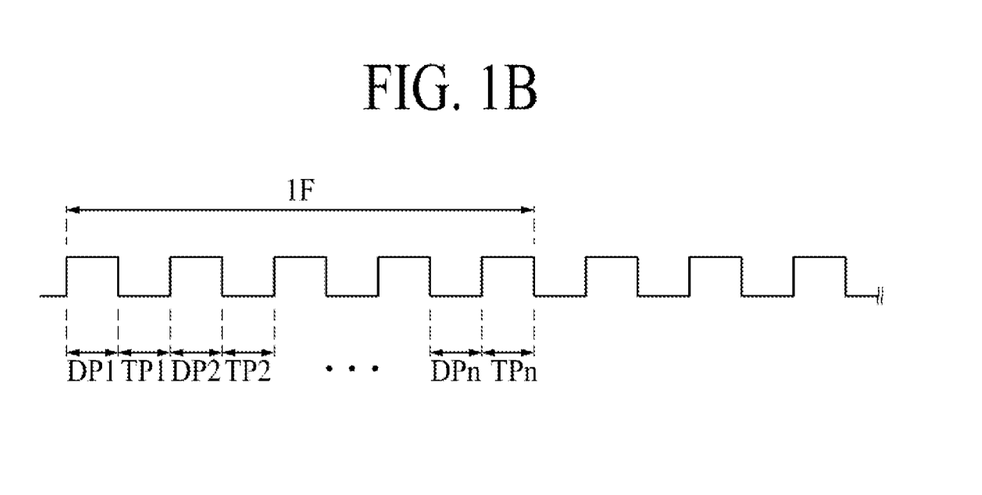

Recently, a display device is formed as a touch display device including a touch screen capable of recognizing a touch of a user. Generally, as illustrated in FIG. 1A or 1B, a touch display device, in which a touch screen is integrated with a display panel, may be driven by time-dividing one frame period 1F into display driving periods (DP) DP1 to DPn in which data of an input image is output to a display panel and touch sensor driving periods (TP) TP1 to TPm in which touch sensors are driven to detect touch information.

In the touch display device driven in the time division manner, a timing controller outputs digital image data to a data driving circuit for the display driving period. Meanwhile, although the timing controller of the touch display device driven in the time division manner does not need to operate for the touch sensor driving period, the timing controller maintains a turn-on state and outputs dummy image data to the data driving circuit. Accordingly, the conventional touch display device has a problem of consuming unnecessary power.

SUMMARY

Accordingly, the present disclosure is designed to solve the problem described above and to provide a timing controller capable of operating in a low-power mode for a touch sensor driving period and a method of driving the same.

In addition, the present disclosure is designed to provide a timing controller capable of preventing data loss and a method of driving the same.

A timing controller according to an aspect of the present disclosure, to achieve the objectives described above, includes a receiver which receives a timing synchronization signal and video image data, a data processor which generates a gate control signal and a data control signal on the basis of the timing synchronization signal and arranges the video image data as pixel data for a display panel, and a transmitter which operates in a normal mode to output the pixel data, the gate control signal, and the data control signal for a display driving period and operates in a low-power mode for at least portion of a touch sensor driving period.

A timing controller according to another aspect of the present disclosure, to achieve the objectives described above, includes a clock generator which receives a reference clock signal and generates a first clock signal, a transmission link which synchronizes pixel data and a data control signal with the first clock signal and outputs the synchronized pixel data and the synchronized data control signal, and a transmitter which is activated to output the pixel data and the data control signal to a data driver of a display panel for a display driving period and is inactivated for at least some time of a touch sensor driving period.

A method of driving a timing controller according to another aspect of the present disclosure, to achieve the objectives described above, includes: generating, by a touch synchronization signal generator, a first timing synchronization signal which time-divides one frame period into a display driving period and a touch sensor driving period, operating a transmitter in a normal mode to output pixel data, a gate control signal, and a data control signal to a data driver of a display panel when the first timing synchronization signal at a high level is generated, and operating the transmitter in a low-power mode when the first timing synchronization signal at a low level is generated.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

A shape, a size, a ratio, an angle, and a number disclosed in the drawings for describing embodiments of the present disclosure are merely an example, and thus the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In describing a time relationship, for example, when the temporal order is described as 'after~', 'subsequent~', 'next~', and 'before~', a case which is not continuous may be included unless 'just' or 'direct' is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or totally coupled to or combined with each other, and may be variously inter-operated and driven technically. The embodiments of the present disclosure may be carried out independently from each other or may be carried out together with a co-dependent relationship.

Hereinafter, exemplary embodiments of the present disclosure will be described with reference to the accompanying drawings.

Figure 2:
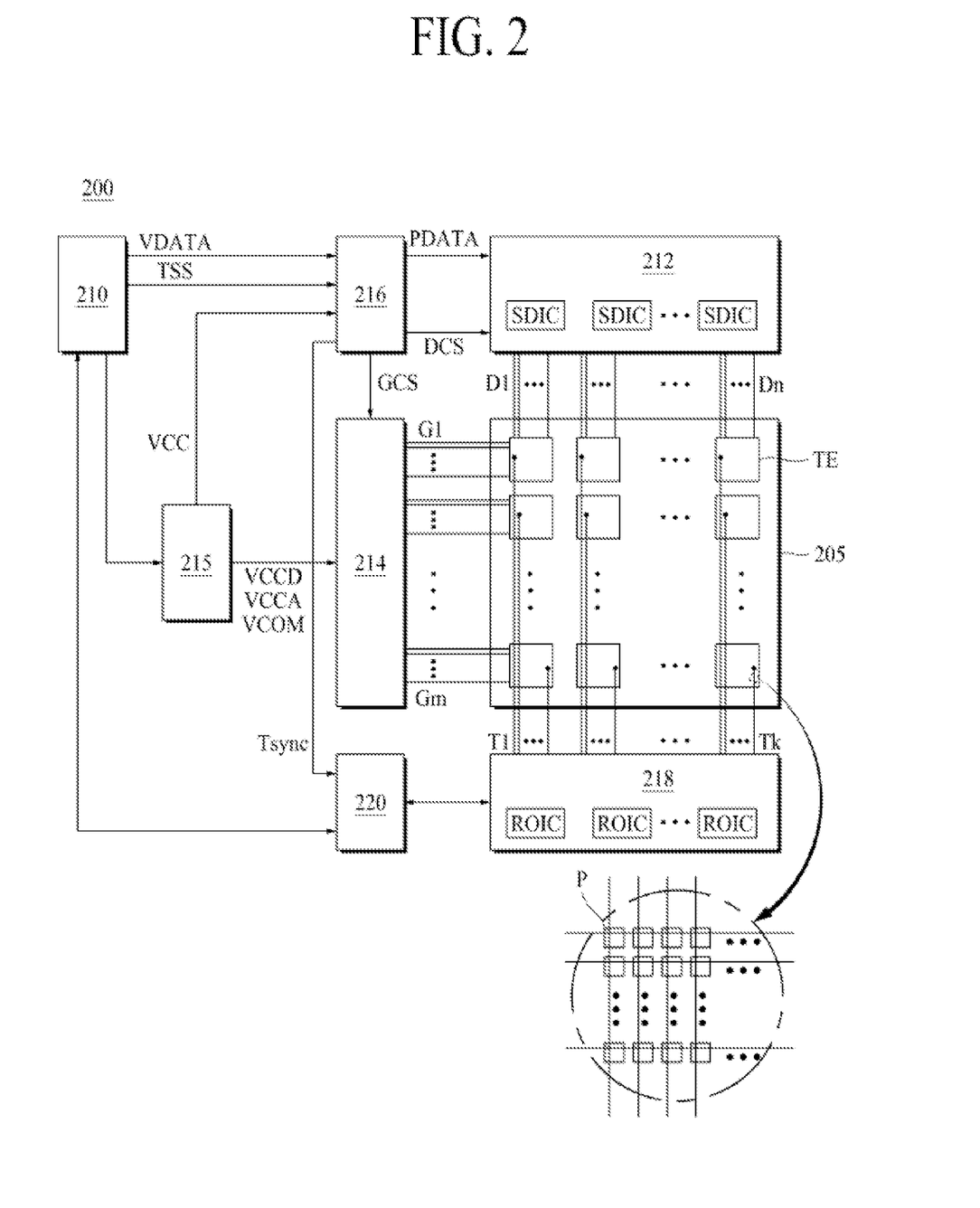
FIG. 2 is a block diagram illustrating a touch display device according to one embodiment of the present disclosure.

FIG. 2 is a block diagram illustrating a touch display device according to one embodiment of the present disclosure.

A touch display device 200 according to one embodiment of the present disclosure performs a display function and a touch sensing function and may be implemented as a flat display device such as a liquid crystal display (LCD) device or an organic light emitting diode (OLED) display device.

The touch display device 200 according to the present disclosure may include a capacitive touch screen to sense a touch of a conductive object such as a finger or active pen. The touch screen may be implemented in a form independent of a display panel for displaying or in a form in which touch sensors (or touch electrodes) are embedded in a pixel array of a display panel.

As illustrated in FIG. 2, the touch display device 200 according to the present disclosure includes a host system 210, a display panel 205, and a display driving device which drives the display panel 205. The display panel 205 displays an image with a predetermined gradation or receives a touch of a finger or active pen. In one example, the display panel 205 may be a display panel having an in-cell touch type structure using a capacitance method. According to such an example, the display panel 205 may be the in-cell touch type display panel using a self-capacitance method or using a mutual-capacitance method. Hereinafter, for the sake of convenience in the description, the display panel 205 will be assumed to be described as the in-cell touch type display panel using the self-capacitance method.

The display panel 205 operates in a display mode and a touch sensing mode. The display panel 205 operates in the display mode for a display driving period to display an image and operates in the touch sensing mode for a touch sensor driving period to serve as a touch panel for touch sensing.

In one example, an operation in the display mode may be performed for a display driving period DP set for one frame as illustrated in FIG. 1A or for each of a plurality of display driving periods DP1 to DPn set for one frame as illustrated in FIG. 1B. In addition, an operation in the touch sensing mode may be performed for a touch sensor driving period TP set for one frame as illustrated in FIG. 1A or for each of a plurality of touch sensor driving periods TP1 to TPm set between the plurality of display driving periods DP1 to DPn for one frame as illustrated in FIG. 1B. In this case, in order to implement high-resolution, a length of the display driving period DP may be set to be greater than a length of the touch sensor driving period TP, or the number of the display driving periods DP1 to DPn may be set to be greater than the number of the touch sensor driving periods TP1 to TPm for one frame.

The display panel 205 includes a plurality of data lines D1 to Dn, a plurality of gate lines G1 to Gm, a plurality of pixels P, a plurality of touch sensors TE, and a plurality of touch lines T1 to Tk. Each of the plurality of data lines D1 to Dn receives a data signal in the display mode. Each of the plurality of gate lines G1 to Gm receives a gate signal in the display mode. The plurality of data lines D1 to Dn and the plurality of gate line G1 to Gm are provided to intersect each other on a substrate to define a plurality of pixel areas. Each of the plurality of pixels P may include a thin film transistor (not shown) connected to the adjacent gate line and data line, a pixel electrode (not shown) connected to the thin film transistor, and a storage capacitor (not shown) connected to the pixel electrode.

Each of the plurality of touch sensors TE may serve as a touch electrode which senses a touch of a finger or active pen or serve as a common electrode which generates an electric field with the pixel electrode to drive a liquid crystal. That is, each of the plurality of touch sensors TE may be used as the touch electrode in the touch sensing mode and used as the common electrode in the display mode.

Since each of the plurality of touch sensors TE is used as a self-capacitance touch sensor in the touch sensing mode, each of the plurality of touch sensors TE should have a size which is greater than a minimum contact size between a touch object and the display panel 205. Accordingly, each of the plurality of touch sensors TE may have the size corresponding to a size of one or more pixels P. In one example, the plurality of touch sensors TE may be disposed along a plurality of horizontal lines and a plurality of vertical lines at predetermined intervals.

Each of the plurality of touch lines T1 to Tk may be individually connected to one of the plurality of touch sensors TE. For the display driving period DP for one frame period illustrated in FIG. 1A or for the display driving periods DP1 to DPn illustrated in FIG. 1B, each of the plurality of touch lines T1 to Tk may supply a common voltage Vcom to the corresponding touch sensor TE.

In the display driving device, data signals are supplied to the plurality of pixels P included in the display panel 205 to display an image through the display panel 205 for the display driving periods DP1 to DPn (hereinafter, referred to as DP) and a touch is sensed through the touch sensors TE for the touch sensor driving periods TP1 to TPm (hereinafter, referred to as TP).

To this end, the display driving device may include a data driver 212, a gate driver 214, a timing controller 216, a touch driver 218, a touch controller 220, and a power supply 215.

The data driver 212 may receive pixel data PDATA and a data control signal DCS from the timing controller 216 for the display driving period DP.

In one example, the data driver 212 may receive a clock embedded data signaling (CEDS) packet from the timing controller 216 and obtain a clock signal, the data control signal DCS, and the pixel data PDATA from the CEDS packet. In this case, the CEDS packet may mean a packet having a form in which a clock is embedded between pieces of data.

Hereinafter, for the sake of convenience in the description, it will be described that the data driver 212 receives the CEDS packet including the pixel data PDATA and the data control signal DCS from the timing controller 216, but the present disclosure is not necessarily limited thereto. The data driver 212 may also receive each of the pixel data PDATA and the data control signal DCS from the timing controller 216.

The data driver 212 may convert the pixel data PDATA having a digital form to analog positive/negative data signals according to the data control signal DCS and provide the analog positive/negative data signals to the pixels P through the plurality of data lines D1 to Dn.

To this end, as illustrated in FIG. 2, the data driver 212 may include a plurality of source drive integrated circuits (ICs) SDIC. In one example, the source drive ICs SDIC may be connected in a cascade manner. The source drive ICs SDIC may be connected to the timing controller 216 in a point-to-point form through a plurality of wire pairs and receive the CEDS packet from the timing controller 216.

The gate driver 214 may receive the gate control signal GCS from the timing controller 216 for the display driving period DP. The gate driver 214 may supply gate signals to the gate lines G1 to Gm according to the gate control signal GCS.

Specifically, for the display driving period DP, the gate driver 214 may generate the gate signals (or scan signals) synchronized with data signals under control of the timing controller 216, shift the generated gate signals, and sequentially supply the shifted gate signals to the gate lines G1 to Gm. To this end, the gate driver 214 may include a plurality of gate drive ICs (not shown). For the display driving period DP, the gate drive ICs may sequentially supply the gate signals synchronized with the data signals to the gate lines G1 to Gm to select the data lines to which the data signals are applied under control of the timing controller 216. The gate signal may swing between a high gate voltage and a low gate voltage.

The timing controller 216 may receive digital video data VDATA and timing synchronization signals TSS from the host system 210. The timing synchronization signals TSS may include a reference clock signal (for example, a dot clock), a vertical synchronization signal, a horizontal synchronization signal, a data enable signal, and the like. The vertical synchronization signal is a signal which defines one frame period. The horizontal synchronization signal is a signal which defines one horizontal period required for supplying the data signals to the pixels P of one horizontal line of the display panel 205. The data enable signal is a signal which defines a period for which effective data is input. The dot clock is a signal which is repeated with a predetermined short period.

In order to control an operation timing of the data driver 212 and an operation timing of the gate driver 214, the timing controller 216 may generate the data control signal DCS to control the operation timing of the data driver 212 and the gate control signal GCS to control the operation timing of the gate driver 214 on the basis of the timing synchronization signals TSS.

For the display driving period DP, the timing controller 216 may output the pixel data PDATA and the data control signal DCS to the data driver 212 and output the gate control signal GCS to the gate driver 214 while operating in a normal mode. Meanwhile, the timing controller 216 may operate in a low-power mode for at least some time of the touch sensor driving period TP. A specific driving method of the timing controller 216 will be described below with reference to FIGS. 2 to 8.

The host system 210 may convert the digital video data VDATA to a format suitable for being displayed on the display panel 205. The host system 210 may transmit the timing synchronization signals TSS to the timing controller 216 with the digital video data VDATA. The host system 210 may be implemented as one of a television system, a set top box, a navigation system, a digital video disc (DVD) player, a blue-ray player, an electronic board, a kiosk system, a personal computer (PC), a home theater system, and a phone system and receive an input image.

Meanwhile, the host system 210 may receive touch input coordinates from the touch controller 220 and execute an application program associated with the touch input coordinates.

The touch driver 218 may drive the touch sensors TE for the touch sensor driving period TP to obtain touch sensing data from the touch sensors TE. To this end, the touch driver 218 may include a plurality of read out ICs ROIC.

In one example, in a case in which the display panel 205 is implemented as a mutual capacitance type, the read out IC ROIC may include a driving circuit which generates a touch driving signal for driving the touch sensor TE and supplies the touch driving signal to each of the touch sensors TE through each of the touch lines T1 to Tk and a sensing circuit which senses a change in capacitance of each of the touch sensors TE through each of the touch lines T1 to Tk and generates touch Raw Data.

In another example, in a case in which the display panel 205 is implemented as a self-capacitance type, the read out IC ROIC may supply a touch driving signal to each of the touch sensors TE and obtain a touch sensing signal from each of the touch sensors TE using one circuit.

Meanwhile, the read out IC ROIC may supply the common voltage to each of the touch sensors TE through each of the touch lines T1 to Tk for the display driving period DP. Accordingly, the touch sensors TE may serve as the common electrode for the display driving period.

In addition, in the above-described example, it has been illustrated that the source drive IC SDIC and the read out IC ROIC are individually implemented, in another example, the source drive IC SDIC and the read out IC ROIC may also be implemented as a type in which the source drive IC SDIC and the read out IC ROIC are integrated in one chip SRIC.

The touch controller 220 may receive the touch sensing data from the touch driver 218. The touch controller 220 may calculate coordinate values of a touch input position according to a touch coordinate calculation method and output coordinate information of the touch input position to the host system 210. The touch controller 220 may be implemented as a micro controller unit (MCU).

The power supply 215 may generate driving power required for driving the display panel 205 using power supplied from the external host system 210. Specifically, the power supply 215 may generate power VCC required for driving the timing controller 216 using the power supplied from the host system 210 and supply the power VCC to the timing controller 216. In addition, the power supply 215 may generate direct current power VCCD, alternating current power VCCA, and a common voltage VCOM required for driving the display panel 205 and supply the direct current power VCCD, the alternating current power VCCA, and the common voltage VCOM to the display panel 205.

Figure 3:
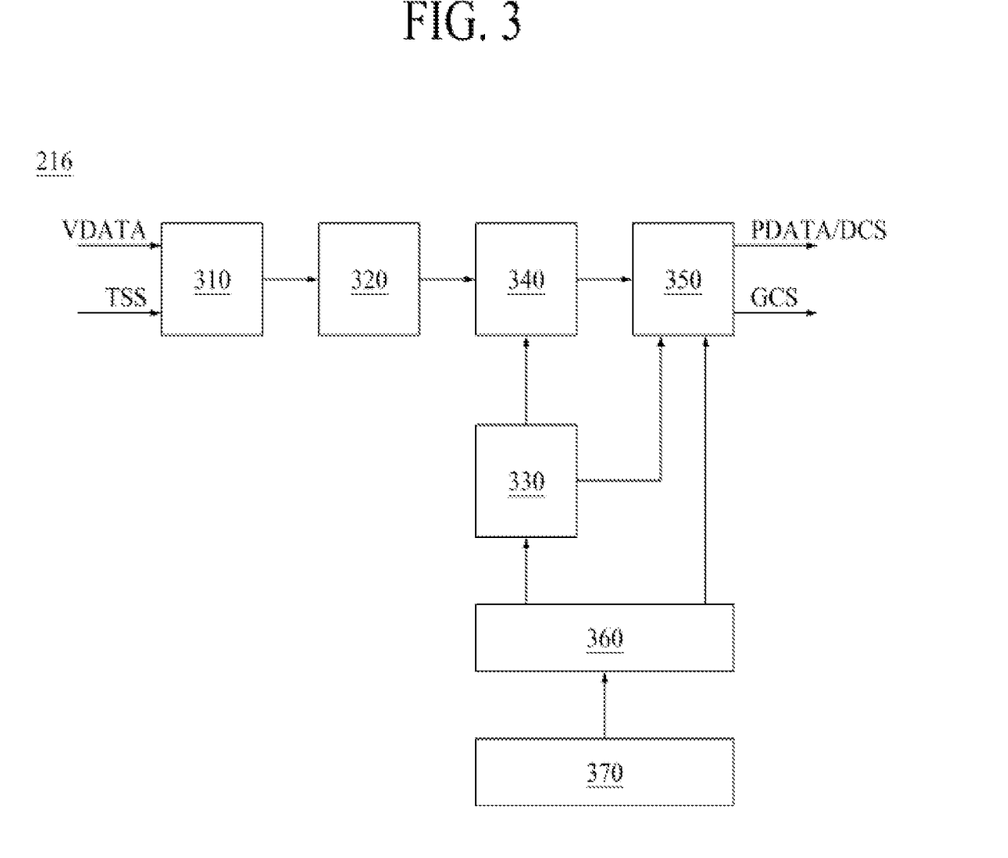
FIG. 3 is a schematic block diagram illustrating a configuration of the timing controller according to one embodiment of the present disclosure.
Figure 4:
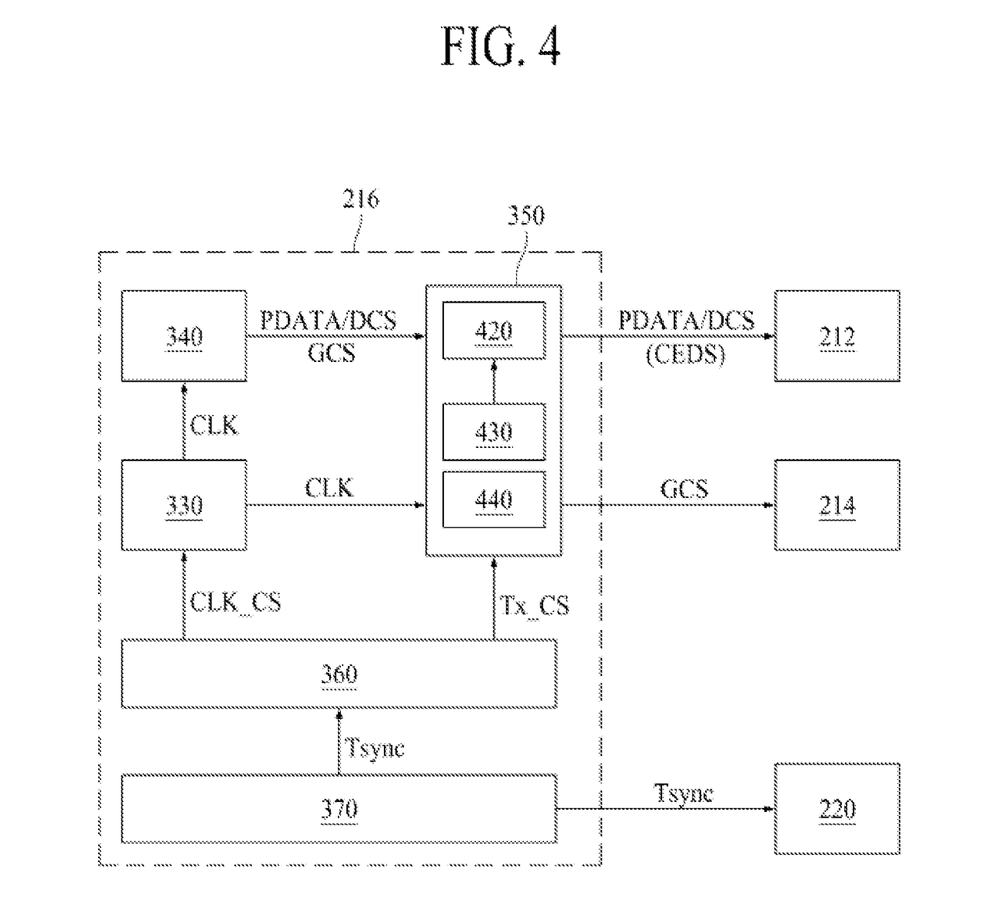
FIG. 4 is a view for describing signals transmitted and received between a clock generator, a transmission link, a transmitter, an on/off controller, and a touch synchronization signal generator illustrated in FIG. 3.
Figure 5:
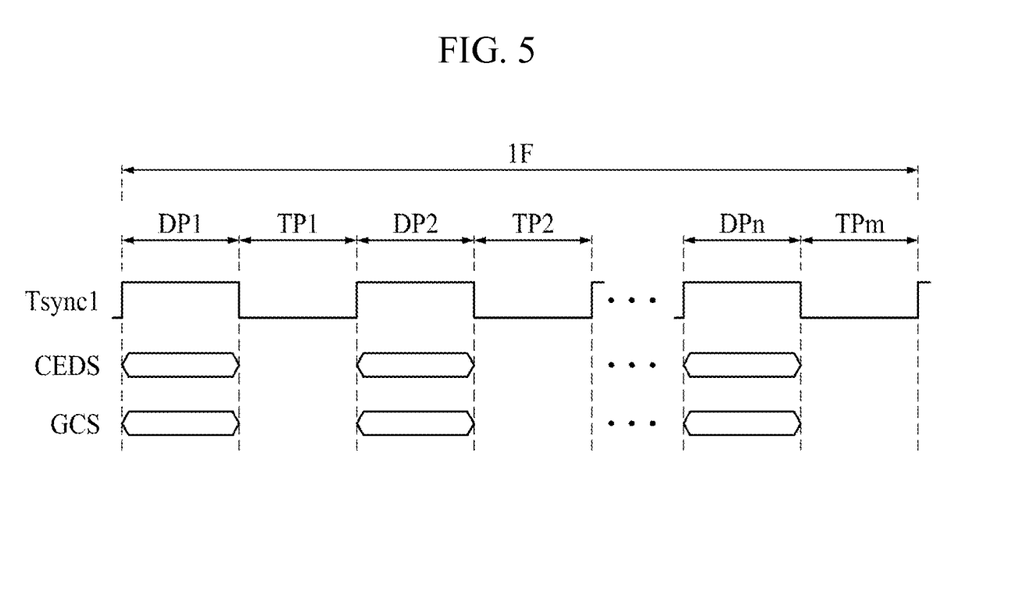
FIG. 5 is a view illustrating one example of a waveform of a signal output from the timing controller.
Figure 6:
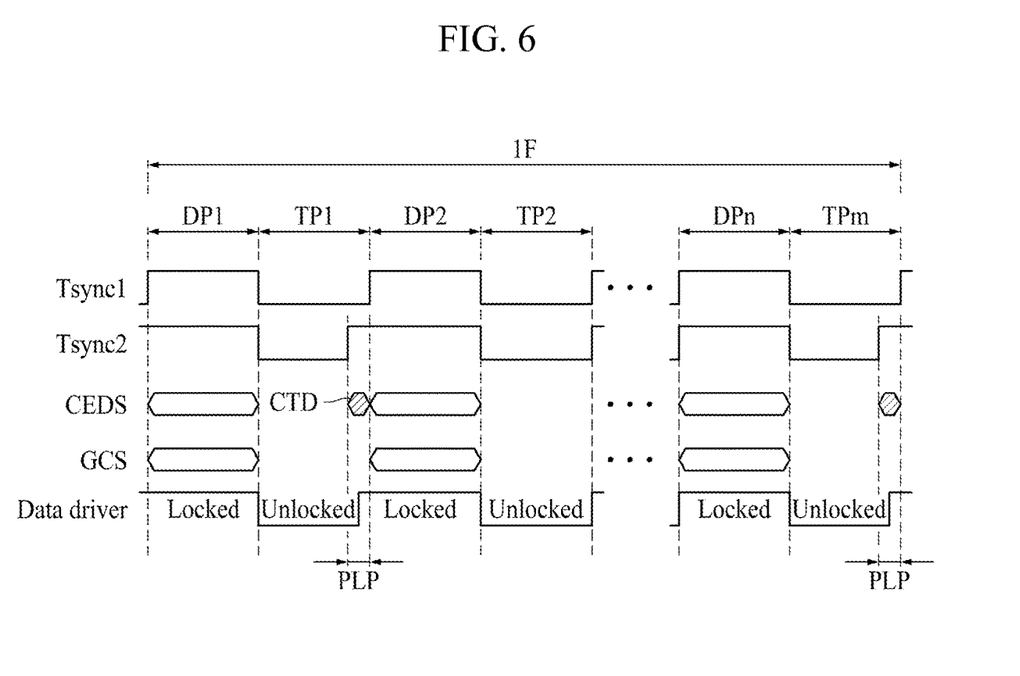
FIG. 6 is a view illustrating another example of the waveform of the signal output from the timing controller.

FIG. 3 is a schematic block diagram illustrating a configuration of the timing controller according to one embodiment of the present disclosure, and FIG. 4 is a view for describing signals transmitted and received between a clock generator, a transmission link, a transmitter, an on/off controller, and a touch synchronization signal generator illustrated in FIG. 3. FIG. 5 is a view illustrating one example of a waveform of a signal output from the timing controller, and FIG. 6 is a view illustrating another example of the waveform of the signal output from the timing controller.

Referring to FIGS. 3 to 6, the timing controller 216 includes a receiver 310, a data processor 320, a clock generator 330, a transmission link 340, a transmitter 350, an on/off controller 360, and a touch synchronization signal generator 370.

The receiver 310 receives the digital video data VDATA and the timing synchronization signals TSS from the external host system 210. The timing synchronization signals TSS may include a reference clock signal, a vertical synchronization signal, a horizontal synchronization signal, a data enable signal, a dot clock, and the like.

The data processor 320 may generate the data control signal DCS to control the operation timing of the data driver 212 and the gate control signal GCS to control the operation timing of the gate driver 214 using the timing synchronization signals TSS.

In addition, the data processor 320 may arrange the digital video data VDATA to match a pixel structure generated in the display panel 205 so as to be converted to the pixel data PDATA. As an example, the data processor 320 may convert and arrange the digital video data VDATA for three colors (red, green, and blue) to the pixel data PDATA for four colors (white, red, green, and blue) using a predetermined conversion method. In addition, the data processor 320 may also process the pixel data PDATA using various image processing methods such as image quality compensation, external compensation, and deterioration compensation.

The data processor 320 may output the pixel data PDATA, the data control signal DCS, and the gate control signal GCS to the transmission link 340.

The clock generator 330 may receive the reference clock signal to generate a first clock signal CLK. The clock generator 330 may provide the first clock signal CLK to the transmission link 340 and the transmitter 350.

The transmission link 340 may receive the first clock signal CLK from the clock generator 330. The transmission link 340 may synchronize the pixel data PDATA, the data control signal DCS, and the gate control signal GCS with the first clock signal CLK. The transmission link 340 may transmit the synchronized pixel data PDATA, data control signal DCS, and gate control signal GCS to the transmitter 350. In this case, the pixel data PDATA transmitted to the transmitter 350 may be parallel data having "j+1" (j is an integer greater than or equal to 1) bits.

The transmitter 350 may receive the pixel data PDATA, the data control signal DCS, and the gate control signal GCS from the transmission link 340 and transmit the data and control signals to the data driver 212 or the gate driver 214. To this end, as illustrated in FIG. 4, the transmitter 350 may include a first data transmission unit 420, a phase locked loop (PLL) 430, and a second data transmission unit 440.

The PLL 430 may receive the first clock signal CLK from the clock generator 330 and generate a second clock signal. The PLL 430 may provide the second clock signal to the first data transmission unit 420.

The first data transmission unit 420 may convert the pixel data PDATA from the parallel data into serial data and output the pixel data PDATA converted into the serial data and the data control signal DCS to the data driver 212. In one example, the first data transmission unit 420 may output the CEDS packet including the pixel data PDATA, the data control signal DCS, and the second clock signal to the data driver 212. In this case, the CEDS packet may be generated by inserting the data control signal DCS and the second clock signal between pieces of pixel data PDATA converted as the serial data.

The second data transmission unit 440 may output the gate control signal GCS to the gate driver 214.

In the timing controller 216 according to one embodiment of the present disclosure, the clock generator 330, the transmission link 340, and the transmitter 350 may operate in the normal mode or low-power mode according to a driving period.

The timing controller 216 according to one embodiment of the present disclosure may operate the clock generator 330, the transmission link 340, and the transmitter 350 in the normal mode for the display driving period DP. The timing controller 216 may output the pixel data PDATA, the data control signal DCS, and the gate control signal GCS.

Meanwhile, in the timing controller 216 according to one embodiment of the present disclosure, at least one of the clock generator 330, the transmission link 340, and the transmitter 350 may operate in the low-power mode for some time of the touch sensor driving period TP. In this case, the timing controller 216 may not output the pixel data PDATA, the data control signal DCS, and the gate control signal GCS.

More specifically, the touch synchronization signal generator 370 may generate a touch synchronization signal Tsync which time-divides one frame 1F period into the display driving period DP and the touch sensor driving period TP in accordance with a timing of the vertical synchronization signal and a timing of the internal data enable signal. The touch synchronization signal Tsync may be a mode selection signal for operating the display panel 205 in the display mode or the touch sensing mode.

The touch synchronization signal generator 370 may time-divide each frame of the display panel 205 into at least two subframes on the basis of the vertical synchronization signal and the internal data enable signal and generate the touch synchronization signal Tsync for driving the display panel 205 in the display mode or the touch sensing mode for each subframe.

The touch synchronization signal generator 370 may provide the generated touch synchronization signal Tsync to the on/off controller 360 and the touch controller 220.

In FIGS. 3 and 4, it is illustrated that the timing controller 216 generates the touch synchronization signal Tsync, but the present disclosure is not necessarily limited thereto. The touch synchronization signal Tsync may also be generated in the touch controller 220.

The on/off controller 360 may control at least one of the clock generator 330, the transmission link 340, and the transmitter 350 to be activated or inactivated or to or not to receive power according to a level of the touch synchronization signal Tsync.

In one example, the on/off controller 360 may control the transmitter 350 and the power supply 215 to be mutually connected or disconnected according to the level of the touch synchronization signal Tsync. When the touch synchronization signal Tsync is a low level signal, the on/off controller 360 may determine an operation mode of the timing controller 216 as the low-power mode and control the transmitter 350 and the power supply 215 to be connected.

Specifically, the transmitter 350 may include a switch to be connected to and disconnected from the power supply 215 which supplies the power VCC. The on/off controller 360 may generate a transmission switch control signal Tx_CS to control turning the switch of the transmitter 350 on and off according to the level of the touch synchronization signal Tsync. The transmission switch control signal Tx_CS may include a first transmission switch control signal to turn the switch of the transmitter 350 off and a second transmission switch control signal to turn the switch of the transmitter 350 on.

When the touch synchronization signal Tsync is the low level signal, the on/off controller 360 may generate the first transmission switch control signal to turn the switch of the transmitter 350 on and transmit the first transmission switch control signal to the transmitter 350. The switch of the transmitter 350 may be turned off according to the first transmission switch control signal to block power from being supplied from the power supply 215. Thus, in the timing controller 216, when the touch synchronization signal Tsync is the low level signal, the transmitter 350 may be turned off. As illustrated in FIG. 5, the timing controller 216 may not output the CEDS packet including the pixel data PDATA and the data control signal DCS and the gate control signal GCS for the touch sensor driving periods TP1 to TPm.

Meanwhile, when the touch synchronization signal Tsync is a high level signal, the on/off controller 360 may determine the operation mode of the timing controller 216 as the normal mode and control the transmitter 350 and the power supply 215 to be connected.

Specifically, when the touch synchronization signal Tsync is the high level signal, the on/off controller 360 may generate the second transmission switch control signal to turn the switch of the transmitter 350 on and transmit the second transmission switch control signal to the transmitter 350. The switch of the transmitter 350 may be turned on according to the second transmission switch control signal so that the power may be supplied from the power supply 215. Thus, in the timing controller 216, when the touch synchronization signal Tsync is the high level signal, the transmitter 350 may be turned on. As illustrated in FIG. 5, the timing controller 216 may output the CEDS packet including the pixel data PDATA and the data control signal DCS and the gate control signal GCS through the transmitter 350 for the display driving periods DP1 to DPn.

It has been described that the on/off controller 360 according to one example controls turning only the transmitter 350 on and off, but the present disclosure is not necessarily limited thereto.

In another example, the on/off controller 360 may control not only the transmitter 350 but also the transmission link 340 and the power supply 215 to be mutually connected or disconnected. When the touch synchronization signal Tsync is the low level signal, the on/off controller 360 may determine the operation mode of the timing controller 216 as the low-power mode and control each of the transmission link 340 and the transmitter 350 to be disconnected from the power supply 215.

Specifically, the transmission link 340 may include a switch to be connected to or disconnected from the power supply 215 which supplies the power VCC. The on/off controller 360 may generate the transmission switch control signal Tx_CS to control turning on and off of the switch of the transmitter 350 and a link switch control signal (not shown) to control turning of and off of the switch of the transmission link 340 according to the level of the touch synchronization signal Tsync. The link switch control signal may include a first link switch control signal for turning the switch of the transmission link 340 off and a second link switch control signal for turning the switch of the transmission link 340 on.

When the touch synchronization signal Tsync is the low level signal, the on/off controller 360 may generate the first transmission switch control signal to turn the switch of the transmitter 350 off and transmit the first transmission switch control signal to the transmitter 350. In addition, when the touch synchronization signal Tsync is the low level signal, the on/off controller 360 may generate the first link switch control signal to turn the switch of the transmission link 340 off and transmit the first link switch control signal to the transmission link 340.

The switch of the transmission link 340 and the switch of the transmitter 350 may be turned off according to the switch control signals so that the power may not be supplied from the power supply 215.

Meanwhile, when the touch synchronization signal Tsync is the high level signal, the on/off controller 360 may determine the operation mode of the timing controller 216 as the normal mode and control each of the transmission link 340 and the transmitter 350 to be connected to the power supply 215.

Specifically, when the touch synchronization signal Tsync is the high level signal, the on/off controller 360 may generate the second transmission switch control signal to turn the switch of the transmitter 350 on and transmit the second transmission switch control signal to the transmitter 350. When the touch synchronization signal Tsync is the high level signal, the on/off controller 360 may generate the second link switch control signal to turn the switch of the transmission link 340 on and transmit the second link switch control signal to the transmission link 340.

The switch of the transmission link 340 and the switch of the transmitter 350 are turned on according to the switch control signals so that the power may be supplied from the power supply 215.

In still another example, the on/off controller 360 may control not only the transmitter 350 but also the clock generator 330 and the power supply 215 to be mutually connected or disconnected. When the touch synchronization signal Tsync is the low level signal, the on/off controller 360 may determine the operation mode of the timing controller 216 as the low-power mode and control each of the clock generator 330 and the transmitter 350 to be disconnected from the power supply 215.

Specifically, the clock generator 330 may include an on/off switch for connection with the power supply 215 which supplies the power VCC. The on/off controller 360 may generate the transmission switch control signal Tx_CS to control turning on and off of the switch of the transmitter 350 and a clock switch control signal CLK_CS to control turning on and off of the switch of the clock generator 330 according to the level of the touch synchronization signal Tsync. The clock switch control signal CLK_CS may include a first clock switch control signal for turning the switch of the clock generator 330 off and a second clock switch control signal for turning the switch of the clock generator 330 on.

When the touch synchronization signal Tsync is the low level signal, the on/off controller 360 may generate the first transmission switch control signal to turn the switch of the transmitter 350 off and transmit the first transmission switch control signal to the transmitter 350. In addition, when the touch synchronization signal Tsync is the low level signal, the on/off controller 360 may generate the first clock switch control signal to turn the switch of the clock generator 330 off and transmit the first clock switch control signal to the clock generator 330.

The switch of the clock generator 330 and the switch of the transmitter 350 are turned off according to the switch control signals so that the power may not be supplied from the power supply 215.

Meanwhile, when the touch synchronization signal Tsync is the high level signal, the on/off controller 360 may determine the operation mode of the timing controller 216 as the normal mode and control each of the clock generator 330 and the transmitter 350 to be connected to the power supply 215.

Specifically, when the touch synchronization signal Tsync is the high level signal, the on/off controller 360 may generate the second transmission switch control signal to turn the switch of the transmitter 350 on and transmit the second transmission switch control signal to the transmitter 350. When the touch synchronization signal Tsync is the high level signal, the on/off controller 360 may generate the second clock switch control signal to turn the switch of the clock generator 330 on and transmit the second clock switch control signal to the transmission link 340.

The switch of the clock generator 330 and the switch of the transmitter 350 may be turned on according to the switch control signals so that the power may be supplied from the power supply 215.

In the timing controller 216 according to one embodiment of the present disclosure, at least one of the clock generator 330, the transmission link 340, and the transmitter 350 may be turned off for the touch sensor driving periods TP1 to TPm. Accordingly, the timing controller 216 according to one embodiment of the present disclosure may block the power from being supplied to at least one of the clock generator 330, the transmission link 340, and the transmitter 350 for the touch sensor driving periods TP1 to TPm to prevent the power from being unnecessarily consumed. Thus, the timing controller 216 according to one embodiment of the present disclosure can reduce power consumption.

Meanwhile, it has been described that the on/off controller 360 according to one example controls at least one of the clock generator 330, the transmission link 340, and the transmitter 350 to be connected to or disconnected from the power supply 215, but the present disclosure is not necessarily limited thereto.

The on/off controller 360 according to another example may control at least one of the clock generator 330, the transmission link 340, and the transmitter 350 to be activated or inactivated according to the level of the touch synchronization signal Tsync.

When the touch synchronization signal Tsync is the low level signal, the on/off controller 360 may determine the operation mode of the timing controller 216 as the low-power mode and inactivate at least one of the clock generator 330, the transmission link 340, and the transmitter 350 to change a state thereof to a standby state. Meanwhile, when the touch synchronization signal Tsync is the high level signal, the on/off controller 360 may determine the operation mode of the timing controller 216 as the normal mode and may activate the inactivated component.

In a timing controller 216 according to another embodiment of the present disclosure, at least one of a clock generator 330, a transmission link 340, and a transmitter 350 is inactivated for at least some time of the touch sensor driving periods TP1 to TPm so that power can be prevented from being consumed unnecessarily.

Meanwhile, in FIG. 5, the timing controller 216 operates in the normal mode for the display driving periods DP1 to DPn and operates in the low-power mode for the touch sensor driving periods TP1 to TPm. That is, it is illustrated that the timing controller 216 repeatedly operates in only the normal mode and the low-power mode, but the present disclosure is not necessarily limited thereto.

In another example, the timing controller 216 may operate in any one of the normal mode, the low-power mode, and a stabilization mode. More specifically, the timing controller 216 may operate in the normal mode for the display driving periods DP1 to DPn. The timing controller 216 may operate in the low-power mode from a start time point to a first time point of each of the touch sensor driving periods TP1 to TPm and operate in the stabilization mode from a time point past the first time point to an end time point of each of the touch sensor driving periods TP1 to TPm.

As described above, when the touch sensor driving periods TP1 to TPm start, the timing controller 216 may turn at least one of the switches of the clock generator 330, the transmission link 340, and the transmitter 350 off to prevent the power from being unnecessarily consumed. In this case, as illustrated in FIG. 6, when the touch sensor driving periods TP1 to TPm start, since the data driver 212 does not receive data from the timing controller 216, the level thereof may be changed to the low level so that the data driver 212 may enter an unlocked state.

Meanwhile, for the display driving periods DP1 to DPn, among the clock generator 330, the transmission link 340, and the transmitter 350, the component, which has been turned off, is turned on again, and the timing controller 216 may transmit the CEDS packet to the data driver 212. In this case, the timing controller 216 needs to secure stabilization periods PLP before the display driving periods DP1 to DPn start to stably transmit and receive data.

In the timing controller 216, when the components, which have been turned off, are turned on again, the component, for example, the clock generator 330 or the PLL 430 which generates the clock signal, generates the clock signal again. In this case, the clock generator 330 or the PLL 430 needs a predetermined time in which a phase and a frequency of the clock signal are fixed so that the clock signal is stabilized.

In addition, the data driver 212 may generate the clock signal again in order to receive data from the timing controller 216. In the data driver 212, the phase and the frequency of the clock signal are fixed so that the clock signal may be stabilized, and the level thereof is changed to the high level so that the data driver 212 may enter a locked state.

As described above, in order to stably transmit and receive the data between the timing controller 216 and the data driver 212, the stabilization period PLP is required. Accordingly, the timing controller 216 may operate in the stabilization mode for the stabilization periods PLP before the display driving periods DP1 to DPn start.

Hereinafter, for the sake of convenience in the description, it will be described that the on/off controller 360 turns only the transmitter 350 on when the touch sensor driving periods TP1 to TPm start, but the present disclosure is not limited thereto. As described above, when the touch sensor driving periods TP1 to TPm start, the on/off controller 360 may turn at least one of the clock generator 330, the transmission link 340, and the transmitter 350 on.

Specifically, the on/off controller 360 may generate the second transmission switch control signal to turn the switch of the transmitter 350 on at a time point past the first time point of each of the touch sensor driving periods TP1 to TPm.

In one example, the on/off controller 360 may internally count a time from a start time point of each of the touch sensor driving periods TP1 to TPm, and when a preset time has elapsed, the on/off controller 360 may generate the second transmission switch control signal to turn the switch of the transmitter 350 on. In this case, the preset time may be a time shorter than a time of each of the touch sensor driving periods TP1 to TPm.

Specifically, when the on/off controller 360 receives the touch synchronization signal Tsync at the low level, the on/off controller 360 may generate the first transmission switch control signal to turn the switch of the transmitter 350 off and transmit the first transmission switch control signal to the transmitter 350. Accordingly, in the timing controller 216, since the power is not supplied to the transmitter 350, the data and control signal may not be output. That is, the timing controller 216 may operate in the low-power mode.

In addition, when a preset time elapses from a time point at which the on/off controller 360 receives the touch synchronization signal Tsync at the low level, the on/off controller 360 may generate the second transmission switch control signal to turn the switch of the transmitter 350 on and transmit the second transmission switch control signal to the transmitter 350. Accordingly, in the timing controller 216, the power may be supplied to the transmitter 350, and clock training data CTD may be output to the data driver 212 through the transmitter 350. That is, the timing controller 216 may operate in the stabilization mode.

When the data driver 212 receives the clock training data CTD, the data driver 212 may start clock training to stably receive the data. When the phase and the frequency of the clock signal are fixed so that the clock signal is stabilized, the data driver 212 may enter the locked state.

In another example, the on/off controller 360 may receive an additional second touch synchronization signal Tsync2 from the touch synchronization signal generator 370.

Specifically, the touch synchronization signal generator 370 may generate a first touch synchronization signal Tsync1 which time-divides one frame 1F period into the display driving period DP and the touch sensor driving period TP and a second touch synchronization signal Tsync2 to secure a stabilization time for the touch sensor driving period TP before the display driving period DP starts.

As illustrated in FIG. 6, when the on/off controller 360 receives the first touch synchronization signal Tsync1 at a low level and the second touch synchronization signal Tsync2 at a low level from the touch synchronization signal generator 370, the on/off controller 360 may generate the first transmission switch control signal to turn the switch of the transmitter 350 off and transmit the first transmission switch control signal to the transmitter 350. Accordingly, in the timing controller 216, the power may not be supplied to the transmitter 350, and the data and the control signal may not be output. That is, the timing controller 216 may operate in the low-power mode.

In addition, when the on/off controller 360 receives the second touch synchronization signal Tsync2 at a high level from the touch synchronization signal generator 370, the on/off controller 360 may generate the second transmission switch control signal to turn the switch of the transmitter 350 on and transmit the second transmission switch control signal to the transmitter 350. Accordingly, in the timing controller 216, the power may be supplied to the transmitter 350, and the clock training data CTD may be output to the data driver 212 through the transmitter 350. That is, the timing controller 216 may operate in the stabilization mode.

When the data driver 212 receives the clock training data CTD, the data driver 212 may start clock training to stably receive the data. When the phase and the frequency of the clock signal are fixed so that the clock signal is stabilized, the data driver 212 may enter the locked state.

In addition, when the on/off controller 360 receives the first touch synchronization signal Tsync1 at a high level from the touch synchronization signal generator 370, the on/off controller 360 may transmit the first touch synchronization signal Tsync1 at the high level to the transmitter 350. While the transmitter 350 operates in the normal mode, the transmitter 350 may output the CEDS packet to the data driver 212 according to the first touch synchronization signal Tsync1 at the high level and output the gate control signal GCS to the gate driver 214.

Since a timing controller 216 according to another embodiment of the present disclosure operates in a stabilization mode for a stabilization period PLP before each of display driving periods DP1 to DPn starts, data transmitted to a data driver 212 can be prevented from being lost.

Meanwhile, in FIGS. 3 to 5, it has been described that, for the touch sensor driving periods TP1 to TPm, all of the components of the transmitter 350 are turned off, and thus the power is not supplied, but the present disclosure is not necessarily limited thereto. In another example, the on/off controller 360 may turn only the first data transmission unit 420 of the transmitter 350 off for at least some time of each of the touch sensor driving periods TP1 to TPm. Among the components of the transmitter 350, since power consumption of the first data transmission unit 420 is highest, the first data transmission unit 420 may be turned off for the touch sensor driving periods TP1 to TPm. Meanwhile, power consumption of the PLL 430 is relatively low when compared to the first data transmission unit 420, and a time is required for stabilizing the clock signal generated when the first data transmission unit 420 is turned off and turned on again. Accordingly, the PLL 430 may decrease or remove the stabilization period PLP by maintaining a turn-on state thereof even for the touch sensor driving periods TP1 to TPm.

Meanwhile, in FIGS. 3 and 4, one first data transmission unit 420 is illustrated, but the present disclosure is not necessarily limited thereto. In another example, the first data transmission unit 420 may be provided as a plurality of first data transmission units 420. In this case, the timing controller 216 may sequentially turn the plurality of first data transmission units 420 on. This will be specifically described with reference to FIGS. 7 and 8.

Figure 7:
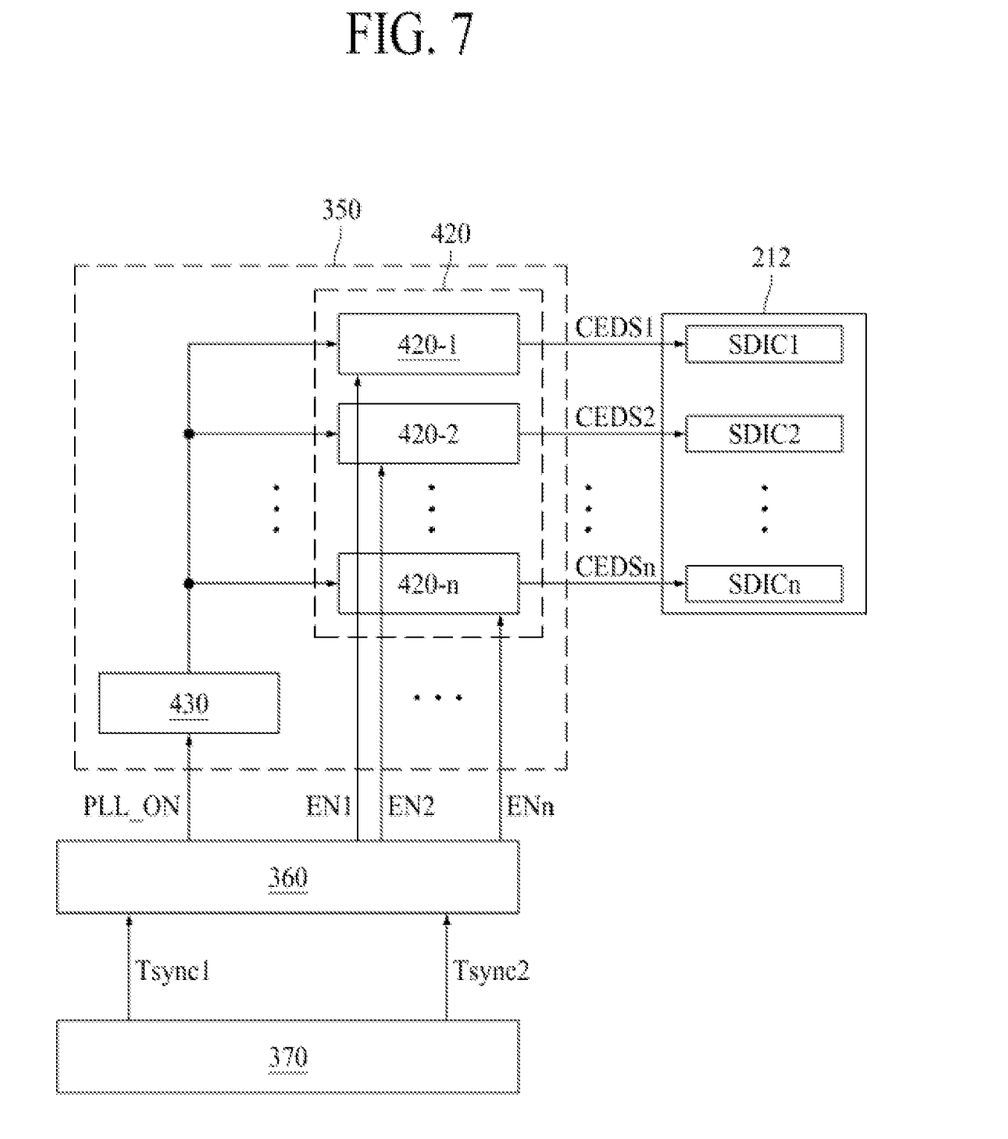
FIG. 7 is a view illustrating another example of the transmitter which is illustrated in FIG. 4.
Figure 8:
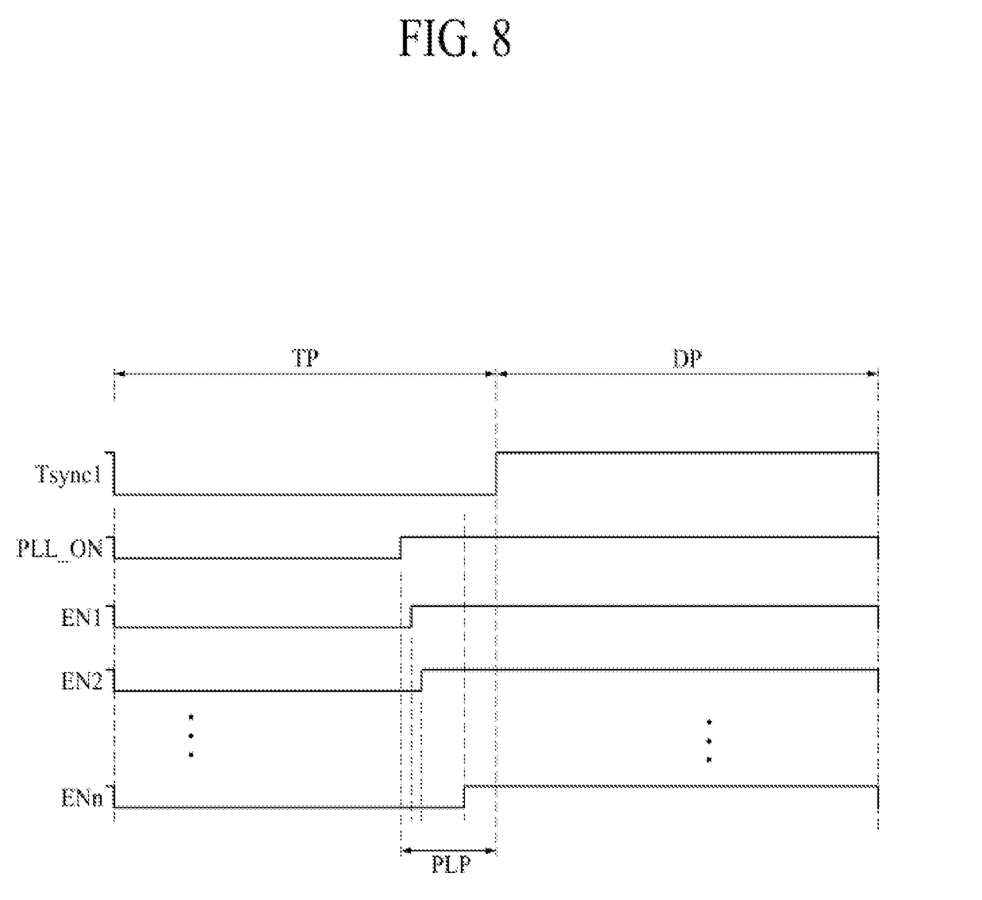
FIG. 8 is a waveform diagram illustrating the plurality of first data transmission units being turned on sequentially.

FIG. 7 is a view illustrating another example of the transmitter which is illustrated in FIG. 4, and FIG. 8 is a waveform diagram illustrating the plurality of first data transmission units being turned on sequentially.

Referring to FIGS. 7 and 8, the transmitter 350 may include the PLL 430 and a plurality of first data transmission units 420-1 and 420-2 to 420-n.

The PLL 430 may receive the first clock signal CLK from the clock generator 330 and generate the second clock signal. The PLL 430 may provide the second clock signal to each of the plurality of first data transmission units 420-1 to 420-n.

The plurality of first data transmission units 420-1 to 420-n may be connected to a plurality of source drive ICs SDIC1 to SDICn included in the data driver 212 in a point-to-point form and transmit CEDS packets CEDS1 to CEDSn.

In one example, the touch synchronization signal generator 370 may generate the first touch synchronization signal Tsync1 which time-divides one frame 1F period into the display driving period DP and the touch sensor driving period TP and the second touch synchronization signal Tsync2 for securing the stabilization time for the touch sensor driving period TP before the display driving period DP starts.

When the on/off controller 360 receives the first touch synchronization signal Tsync1 at the low level and the second touch synchronization signal Tsync2 at the low level from the touch synchronization signal generator 370, the on/off controller 360 may generate the first clock switch control signal to turn a switch of the PLL 430 off and the first transmission switch control signal to turn a switch of each of the plurality of first data transmission units 420-1 to 420-n off. The on/off controller 360 may transmit the first clock switch control signal and the first transmission switch control signal to the PLL 430 and each of plurality of first data transmission units 420-1 to 420-n at the same time. Accordingly, the switch of each of the PLL 430 and plurality of first data transmission units 420-1 to 420-n may be turned off at the same time. In addition, in the transmitter 350, the power may not be supplied to the PLL 430 and plurality of first data transmission units 420-1 to 420-n, and the CEDS packets CEDS1 to CEDSn may not be output to the plurality of source drive ICs SDIC1 to SDICn.

In addition, when the on/off controller 360 receives the second touch synchronization signal Tsync2 at the high level from the touch synchronization signal generator 370, the on/off controller 360 may generate a second clock switch control signal PLL_ON to turn the switch of the PLL 430 on and second transmission switch control signals EN1 to ENn to turn the switches of the plurality of first data transmission units 420-1 to 420-n on.

The on/off controller 360 may primarily transmit the second clock switch control signal PLL_ON to the PLL 430 to stabilize the clock signal for the stabilization period PLP. Then, the on/off controller 360 may sequentially transmit the second transmission switch control signals EN1 to ENn to the plurality of first data transmission units 420-1 to 420-n. Accordingly, the plurality of first data transmission units 420-1 to 420-n may not be enabled at the same time but may be enabled sequentially.

When an amount of current increases quickly, power supply of the power supply 215 may be unstable. In this case, characteristics of circuits which receive the power from the power supply 215 may be degraded.

Since a timing controller 216 according to another embodiment of the present disclosure may turn a plurality of first data transmission units 420-1 to 420-n on sequentially, a peak amount of current of a power supply 215 may be dispersed. Accordingly, the timing controller 216 according to another embodiment of the present disclosure can stably receive power from the power supply 215 to prevent characteristics of an internal circuit from being degraded.

Figure 9:
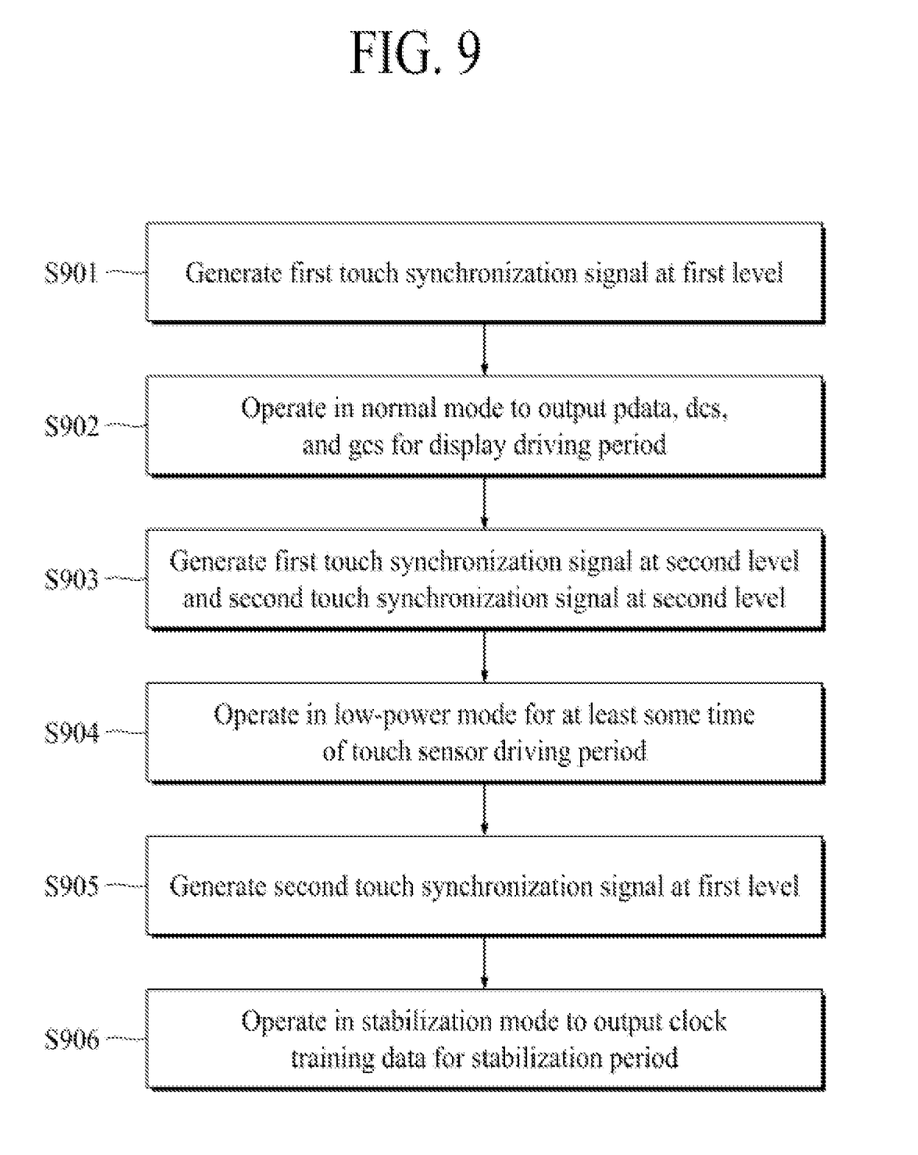
FIG. 9 is a flowchart showing a method of driving the timing controller according to one embodiment of the present disclosure.

FIG. 9 is a flowchart showing a method of driving the timing controller according to one embodiment of the present disclosure.

Referring to FIG. 9, first, the timing controller 216 generates the first touch synchronization signal Tsync1 at a first level (S901). In one example, the timing controller 216 may generate the first touch synchronization signal Tsync1 at the high level for the display driving period DP.

In FIG. 9, it has been described that the timing controller 216 generates the first touch synchronization signal Tsync1, but the present disclosure is not necessarily limited thereto. In another example, the timing controller 216 may receive the first touch synchronization signal Tsync1 from the touch controller 220.

Then, the timing controller 216 operates in the normal mode for the display driving period DP of one frame period (S902). Specifically, the timing controller 216 outputs the pixel data PDATA, the data control signal DCS, and the gate control signal GCS while operating in the normal mode for the display driving period DP.

In one embodiment, the timing controller 216 may output the CEDS packet in which the data control signal DCS and the clock signal are embedded between pieces of pixel data PDATA to the data driver 212.

Then, the timing controller 216 generates the first touch synchronization signal Tsync1 at a second level and the second touch synchronization signal Tsync2 at a second level (S903). In one embodiment, the timing controller 216 may generate the first touch synchronization signal Tsync1 at the low level and the second touch synchronization signal Tsync2 at the low level for the touch sensor driving period TP.

Then, the timing controller 216 operates in the low-power mode for at least some time of the touch sensor driving period TP of one frame period (S904). Specifically, when the first touch synchronization signal Tsync1 at the second level is generated, the timing controller 216 disconnects at least one of the clock generator 330, the transmission link 340, and the transmitter 350 from the power supply 215 while operating in the low-power mode.

In one example, the transmitter 350 may include the plurality of first data transmission units 420. When the first touch synchronization signal Tsync1 at the second level is generated, the timing controller 216 may disconnect each of the plurality of first data transmission units 420 from the power supply 215 at the same time.

Then, the timing controller 216 generates the second touch synchronization signal Tsync2 at a first level (S905). The timing controller 216 may generate the second touch synchronization signal Tsync2 at the first level when a first time, which is shorter than a time of the touch sensor driving period TP, elapses.

Then, the timing controller 216 operates in the stabilization mode for the stabilization period PLP (S906). Specifically, the timing controller 216 may turn the components, which are turned off in the low-power mode, on among the clock generator 330, the transmission link 340, and the transmitter 350. In addition, the timing controller 216 may output the clock training data CTD to the data driver 212 for the stabilization period PLP.

In one example, the transmitter 350 may include the plurality of first data transmission units 420. The timing controller 216 may sequentially connect each of the plurality of first data transmission units 420 to the power supply 215 for the stabilization period PLP.

For example, when the touch sensor driving period TP starts and the first time, which is shorter than the time of the touch sensor driving period TP, elapses, the timing controller 216 may connect one first data transmission unit 420 to the power supply 215. When the touch sensor driving period TP starts and a second time, which is shorter than the time of the touch sensor driving period TP and longer than the first time, elapses, the timing controller 216 may connect another first data transmission unit 420 to the power supply 215. When the touch sensor driving period TP starts and a third time, which is shorter than the time of the touch sensor driving period TP and longer than the second time, elapses, the timing controller 216 may connect still another first data transmission unit 420 to the power supply 215.

Then, the timing controller 216 may repeat operations S901 to S906.

According to the present disclosure, a timing controller can operate in a low-power mode for a touch sensor driving period. Accordingly, the present disclosure can prevent power from being unnecessarily consumed by the timing controller for the touch sensor driving period.

In addition, according to the present disclosure, the timing controller can operate in a stabilization mode for a stabilization period before a display driving period starts. Accordingly, the present disclosure can prevent data transmitted from the timing controller to a data driver from being lost.

In addition, since the present disclosure sequentially turns a plurality of first data transmission units on, a peak amount of current of a power supply can be dispersed. Accordingly, in the present disclosure, the timing controller can stably receive power from the power supply and prevent characteristics of an internal circuit from being degraded.

What is claimed is:

1. A timing controller comprising:
a receiver which receives a timing synchronization signal and digital video data;
a data processor which generates a gate control signal and a data control signal on the basis of the timing synchronization signal and arranges the digital video data as pixel data for a display panel; and
a transmitter which operates in a normal mode to output the pixel data, the gate control signal, and the data control signal for a display driving period, and operates in a low-power mode from a start time point of a touch sensor driving period to a first time point, and operates in a stabilization mode from a time point past the first time point of the touch sensor driving period to an end time point.

2. The timing controller of claim 1, further comprising an on/off controller which controls a connection between the transmitter and a power supply according to an operation mode.

3. The timing controller of claim 2, wherein the on/off controller controls:
the transmitter to be disconnected from the power supply when the operation mode is the low-power mode; and
the transmitter to be connected to the power supply when the operation mode is the normal mode.

4. The timing controller of claim 2, wherein the transmitter includes:
a phase locked loop which receives a first clock signal and generates a second clock signal; and a data transmission unit which converts parallel data to serial data and outputs the serial data in response to the second clock signal,
wherein the on/off controller controls at least one of the data transmission unit and the phase locked loop to be disconnected from the power supply when the operation mode is the low-power mode.

5. The timing controller of claim 2, wherein
the on/off controller controls the transmitter to be connected to the power supply when the operation mode is the stabilization mode.

6. The timing controller of claim 1, wherein the transmitter outputs a clock embedded data signaling (CEDS) packet including the pixel data, the data control signal, and a clock signal.

7. The timing controller of claim 1, further comprising:
a clock generator which receives a reference clock signal and generates a first clock signal;
a transmission link which synchronizes the pixel data and the data control signal with the first clock signal and outputs the synchronized pixel data and the synchronized data control signal to the transmitter; and
an on/off controller which controls each of the transmission link and the transmitter to be disconnected from a power supply when an operation mode is the low-power mode and the each of the transmission link and the transmitter to be connected to the power supply when the operation mode is the normal mode.

8. A timing controller comprising:
a clock generator which receives a reference clock signal and generates a first clock signal;
a transmission link which synchronizes pixel data and a data control signal with the first clock signal and outputs the synchronized pixel data and the synchronized data control signal;
a transmitter which is activated to output the pixel data and the data control signal to a data driver of a display panel for a display driving period, and is inactivated for at least some time of a touch sensor driving period; and
an on/off controller which controls the transmitter to be activated or to be connected to a power supply according to a level of the touch synchronization signal,
wherein the on/off controller controls:
the transmitter to be disconnected from the power supply when the touch synchronization signal is a low level signal; and
the transmitter to be connected to the power supply when a first time, which is shorter than a time of the touch sensor driving period, elapses.

9. The timing controller of claim 8, further comprising:
a touch synchronization signal generator which generates the touch synchronization signal to time-divide one frame period into the display driving period and the touch sensor driving period,
wherein the on/off controller controls at least one of the clock generator, the transmission link, and the transmitter to be activated or to be connected to a power supply according to a level of the touch synchronization signal.

10. The timing controller of claim 9, wherein the on/off controller controls:
at least one of the clock generator, the transmission link, and the transmitter to be disconnected from the power supply when the touch synchronization signal is a low level signal; and each of the clock generator, the transmission link, and the transmitter to be connected to the power supply when the touch synchronization signal is a high level signal.

11. The timing controller of claim 9, wherein the touch synchronization signal includes:
- a first touch synchronization signal for time-dividing into the display driving period and the touch sensor driving period; and
- a second touch synchronization signal for securing a stabilization time for the touch sensor driving period before the display driving period starts.

12. The timing controller of claim 11, wherein the on/off controller controls:
- at least one of the clock generator, the transmission link, and the transmitter to be disconnected from the power supply when the first touch synchronization signal is a low level signal; and
- each of the clock generator, the transmission link, and the transmitter to be connected to the power supply when the second touch synchronization signal is a high level signal.

13. The timing controller of claim 9, wherein the transmitter includes:
- a phase locked loop which receives the first clock signal and generates a second clock signal; and
- a plurality of data transmission units which convert parallel data to serial data and output the serial data in response to the second clock signal,
- wherein the on/off controller controls each of the plurality of data transmission units to be disconnected from the power supply at the same time when the touch synchronization signal is a low level signal, one data transmission unit to be connected to the power supply when a first time, which is shorter than a time of the touch sensor driving period, elapses, and another data transmission unit to be connected to the power supply when a second time, which is shorter than the time of the touch sensor driving period and longer than the first time, elapses.

14. A method of driving a timing controller, comprising:
- generating, by a touch synchronization signal generator, a first timing synchronization signal which time-divides one frame period into a display driving period and a touch sensor driving period;
- operating a transmitter in a normal mode to output pixel data, a gate control signal, and a data control signal to a data driver of a display panel when the first timing synchronization signal at a high level is generated;
- operating the transmitter in a low-power mode when the first timing synchronization signal at a low level is generated,
- generating, by the touch synchronization signal generator, a second timing synchronization signal for securing a stabilization time for the touch sensor driving period before the display driving period starts; and
- operating the transmitter in a stabilization mode to output clock training data when the second timing synchronization signal at a high level is generated.

15. The method of claim 14, wherein, in the operating in the low-power mode:
- the transmitter is inactivated; or
- the transmitter is disconnected from a power supply.

16. The method of claim 14, wherein:
- the transmitter includes a plurality of data transmission units; and
- in the operating in the stabilization mode, the plurality of data transmission units are sequentially activated, or the plurality of data transmission units are sequentially connected to a power supply.

* * * * *